INVENTOR.
Walter H. Hogan

Oct. 6, 1964

W. H. HOGAN 3,151,466

CLOSED-CYCLE CRYOGENIC REFRIGERATOR
AND APPARATUS EMBODYING SAME

Filed Aug. 16, 1963

INVENTOR.
Walter H. Hogan
BY
Attorney

Oct. 6, 1964 W. H. HOGAN 3,151,466
CLOSED-CYCLE CRYOGENIC REFRIGERATOR
AND APPARATUS EMBODYING SAME
Filed Aug. 16, 1963 5 Sheets-Sheet 4

INVENTOR.
Walter H. Hogan
BY
Attorney

United States Patent Office 3,151,466
Patented Oct. 6, 1964

3,151,466
CLOSED-CYCLE CRYOGENIC REFRIGERATOR AND APPARATUS EMBODYING SAME
Walter H. Hogan, Wayland, Mass., assignor to Arthur D. Little, Inc., Cambridge, Mass., a corporation of Massachusetts
Filed Aug. 16, 1963, Ser. No. 302,691
10 Claims. (Cl. 62—6)

This invention relates to refrigeration apparatus capable of delivering refrigeration in the cryogenic temperature range, and more particularly to refrigeration apparatus adapted to be constructed as a small closed cycle unit suitable for incorporation into other equipment which requires cryogenic temperatures for operation.

Many devices now require cooling to temperatures within the range of 10° to 50° K. One example of such a device is an infrared detection apparatus which requires the cooling of the detecting element to attain maximum sensitivity. Another example of such a device is the so-called cryopump which requires the provision of a surface maintained at a temperature below about 20° K. for the condensation of residual gases to reduce the pressure within the cryopumped chamber to about $10^{-10}$ mm. Hg. These chambers find use in research, including space simulation work.

Many devices refrigerated to below 20° K. are provided with radiation shielding at some higher temperature, for example, 77° K. which is the temperature at which liquid nitrogen undergoes a phase change. The refrigerated radiation shielding is required to intercept the radiation heat load from normal room temperature bounding surfaces. Typically, radiation heat load is many times greater than the load generated at low temperature, and interception of this load at 77° K. can reduce the radiation load to lower temperatures by over 99 percent. This is, of course, the primary reason for using a shield. In many applications, such as cryopumped space simulation chambers or helium liquefiers, the refrigeration for the radiation shield is provided by liquid nitrogen phase change.

It has been customary in many of these applications to employ both liquid nitrogen and liquid hydrogen as cooling fluids. However, the hazards associated with the handling of liquid hydrogen make it highly desirable to eliminate the use of this fluid, and to use only one cooling fluid, namely, liquid nitrogen. The apparatus of this invention makes this possible.

Moreover, because of the increasing availability and low cost of liquid nitrogen, its use in many cases is more reliable and economical than providing mechanical refrigeration for these temperature levels. The refrigeration apparatus of this invention therefore is designed to use the temperature difference between ambient, about 300° K., and liquid nitrogen, about 77° K., temperatures to provide a source of energy to furnish refrigeration at temperatures below liquid nitrogen temperature.

It is therefore a primary object of this invention to provide a small, compact refrigeration apparatus operating with helium in a closed cycle, capable of furnishing refrigeration down to about 10° K. It is another object of this invention to provide refrigeration apparatus of the character described in which the mechanical work input is only that required to overcome frictional losses. It is another object of this invention to provide such a refrigeration apparatus which is suitable for direct incorporation into other apparatus, such as sensitive detecting devices, cryopumps, and helium liquefiers. It is yet another object of this invention to provide refrigeration apparatus using a single, externally supplied refrigerant, namely, liquid nitrogen. It is yet a further object of this invention to provide refrigeration apparatus of the character described which is capable of operating on a cycle in which heat is supplied at room temperature, and rejected at about 80° K. by boiling sufficient liquid nitrogen. Other objects of the invention will in part be obvious, and will in part be apparent hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the detailed description taken in connection with the accompanying drawings in which.

Figure 1:
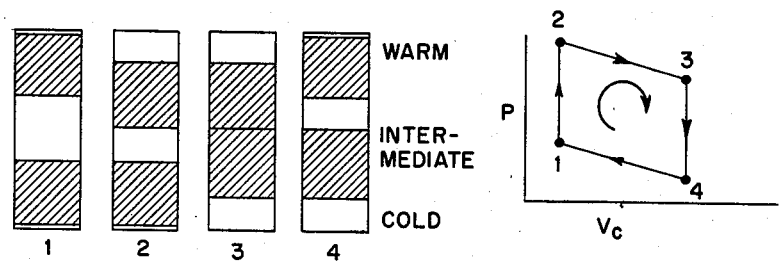
FIG. 1 is a schematic of the cycle employed by the apparatus of this invention.
Figure 6:
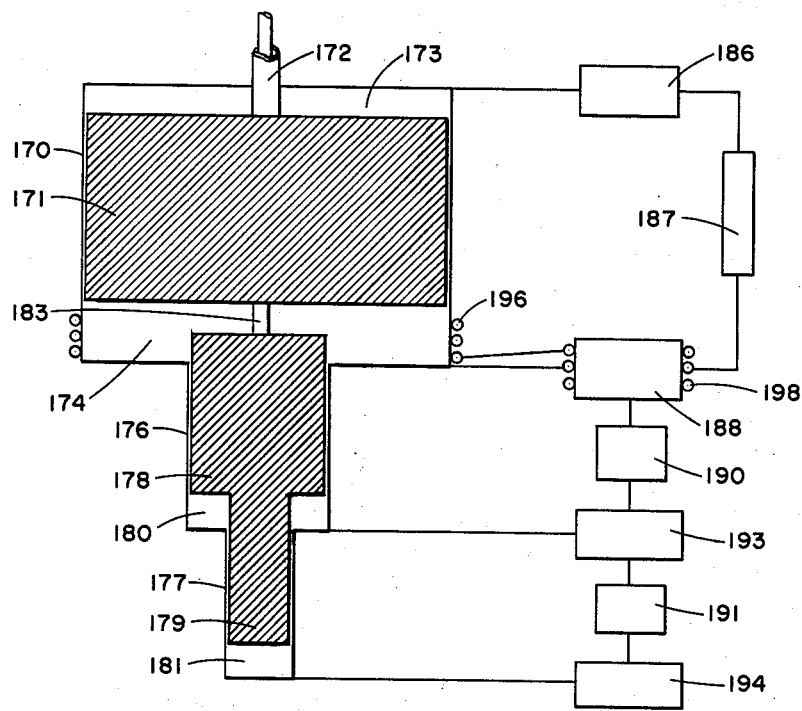
FIG. 6 is a diagrammatic representation of a modification of the refrigerator of this invention.

As will become apparent in the description of the apparatus, there are provided three volumes which are variable and which, for convenience, are designated the warm volume, the intermediate temperature volume, and the cold volume, of which there may be more than one as shown in FIG. 6. It will be appreciated that these terms are merely relative since, in the embodiment described below, "warm" refers to room temperature, "intermediate temperature" refers to liquid nitrogen temperature or 77° K., and "cold" refers to temperatures between about 10° and 50° K. Separate volumes are connected to each other through heat exchangers and regenerators. While the motions of the displacers which control the three volumes are continuous and phase-separated by 90°, these motions can be represented by four separate strokes as shown in FIG. 1. It will be noticed that the volume of the fluid system remains constant while the fluid is merely shuttled from one space to another through the heat exchangers and regenerators. Under ideal conditions, no pressure drop occurs in the apparatus and therefore for all practical purposes the pressure is uniform throughout the fluid system.

In step 1 to 2 of FIG. 1, some of the fluid is displaced from the intermediate volume to the warm temperature volume, causing an increase in pressure in the whole system. This is shown in the indicator diagram as line 1 to 2. In step 2 to 3, fluid is displaced from the intermediate temperature volume to the cold end volume, causing a decrease in the pressure in the system, as shown by line 2 to 3 in the indicator diagram. Step 3 to 4 displaces fluid from the warm temperature volume to the intermediate temperature volume, causing a further decrease in system pressure, as shown by line 3 to 4 on the indicator diagram. Step 4 to 1 completes the cycle. Thus, at the cold end a closed PV or indicator diagram is described in a clockwise direction, indicating an enthalpy loss in the fluid which can be restored by a heat input, thereby providing refrigeration.

Figure 2:
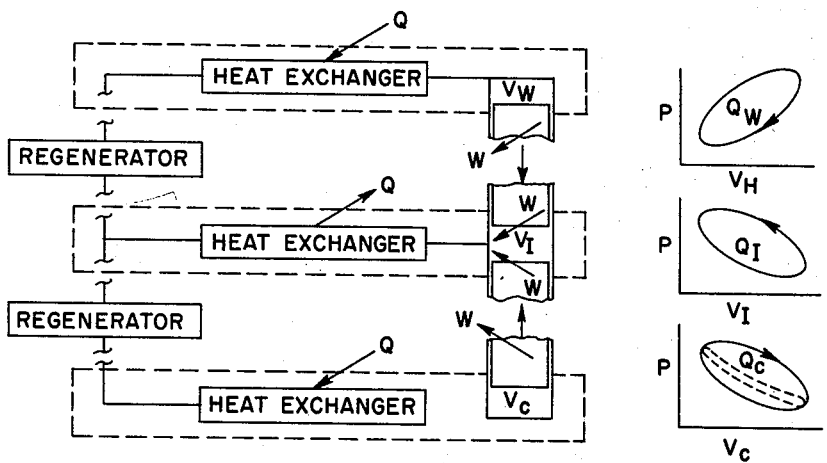
FIG. 2 are PV diagrams for the three volumes of the refrigerator.

In FIG. 2 the system is shown separated into its three temperature zones, each with a dotted thermodynamic boundary, and joined to each other through regenerators which are assumed for purposes of explanation to be ideal temperature isolators. For a complete cycle of each of the three systems, the first law of thermodynamics reduces to:

$$Q = (h_2 - h_1) + W$$

where Q and W represent energy per pound of fluid flowing into or out of the swept volume. It is known that the temperature of the fluid crossing the boundaries does not vary with time, since ideal regenerators were assumed, $h_2 = h_1$, and $Q = W$.

Referring to the room temperature (warm) zone in FIG. 2, the bounded area of the PV diagram represents the work done by the fluid on the displacer in volume V and also the heat input at the room temperature end, $Q_W$. In doing work on the displacer, the fluid cools. The temperature of the fluid is restored by the heat input through the heat exchanger. Similarly at the cold end, work is done on the displacer by the fluid, and the temperature of the fluid is restored by heat input through the cold end heat exchanger, thus providing refrigeration. The work extracted from these two zones, warm and cold, supplies the work to the fluid at the intermediate, liquid nitrogen, temperature volume. An amount of heat equivalent to these two work inputs is rejected through the heat exchanger to boil liquid nitrogen. Obviously, the areas representing $Q_W$ and $Q_C$ must equal $Q_I$ as the system performs no net work and maintains temperature equilibrium. The net result of the operation is to take in heat at room temperature (in $V_W$) and reject it at near liquid nitrogen temperature (in $V_I$), using the available energy to pump heat up from some lower temperature, also to be rejected at liquid nitrogen temperature.

The ratio of the area of the cold end PV diagram, $Q_C$, to the warm end PV diagram, $Q_W$ is the overall internal coefficient of performance and is equal to:

$$\frac{Q_C}{Q_W} = \left[\frac{T_W - T_I}{T_W}\right] \cdot \left[\frac{T_C}{T_I - T_C}\right]$$

where T is temperature, and subscripts W, I, and C refer to warm end, intermediate temperature and cold end, respectively. The first part of this expression gives the efficiency of conversion of thermal energy to work of an engine operating between $T_W$ and $T_I$, and the second expression gives the coefficient of performance of the heat pump raising heat from $T_C$ to $T_I$. For temperature levels of 300° K.=$T_W$, 80° K.=$T_I$, and 10° K.=$T_C$ $$Q_C/Q_W = 1/12.3$$

that is to say the PV area $Q_W$ would be 12.3 times larger than the PV area $Q_C$. If the physical swept volume $V_C$ were the same as the swept volume $V_W$, then the PV diagram $Q_C$ would be very narrow, as shown by the continuous dotted line in the P–$V_C$ diagram in FIG. 2. Therefore, to make a well rounded PV diagram, which means getting the maximum refrigeration from the gas expanded in $V_C$, it is necessary to make $V_C$ smaller than $V_W$ by at least the ratio of $Q_C$ to $Q_W$ as determined by the above equation. This ratio develops the best PV diagram occupying the implied rectangle defined by the pressure difference and the swept volume. However, because of inevitable void spaces in the regenerators, heat exchangers, cross head, etc., it is usually desirable to make this ratio even larger, and experience shows that up to ten times this ratio may be desirable, that is, the ratio of warm to cold volume, operating at these temperatures, may be as much as 120 to 1.

Figure 3A:
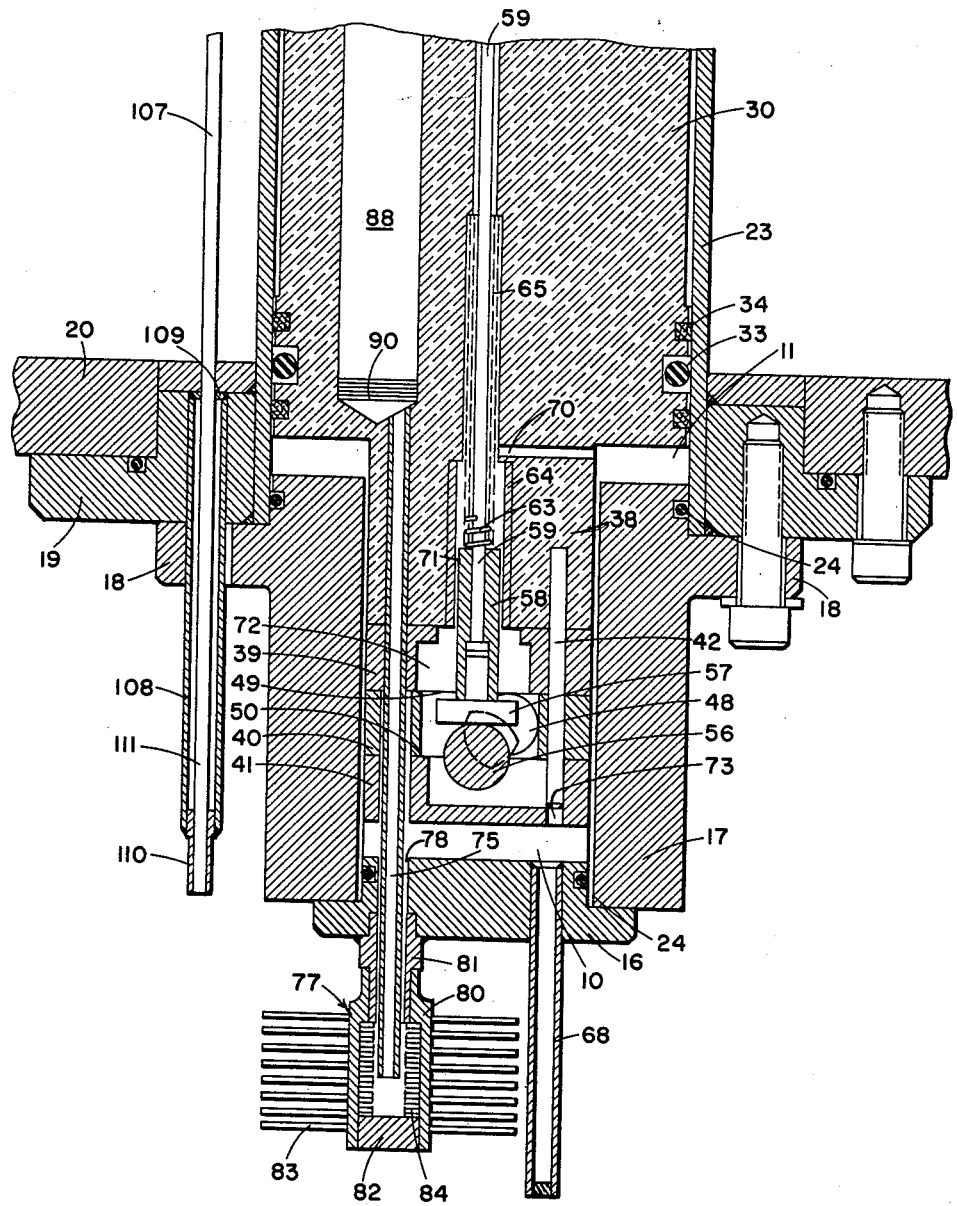
FIGS. 3a and 3b are, in combination, a longitudinal cross-sectional representation of the apparatus of this invention.
Figure 3B:
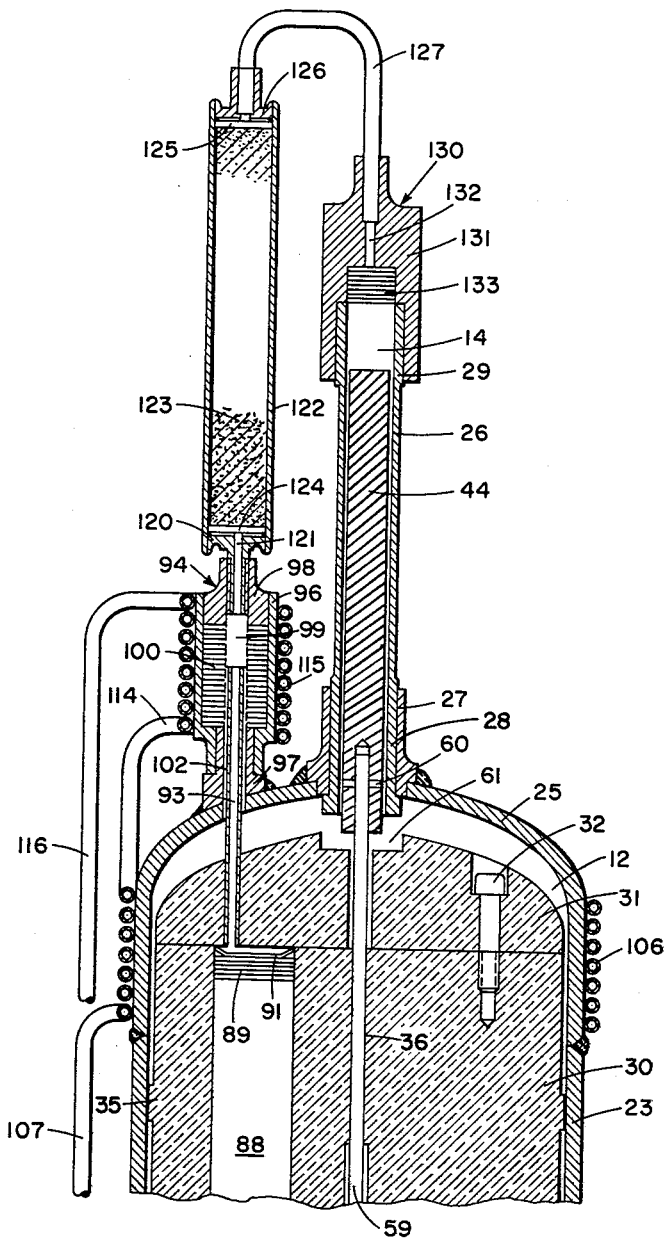

With this brief description of the cycle, it is possible now to turn to FIGS. 3a and 3b which together are a longitudinal cross-section of the apparatus of this invention. The apparatus is illustrated in this manner to better indicate intricate details, e.g., gas passageways, etc. For convenience in the description, terms such as "upper" and "lower" will be used, but as in the case of terms used to describe the various temperatures of the volumes, these terms are also relative. It will of course be appreciated that the refrigeration apparatus may be oriented in any fashion desired, and hence terms such as "upper," and "lower," "up" and "down" are merely used in connection with the apparatus orientation illustrated in FIGS. 3a and 3b.

In FIGS. 3a and 3b it will be helpful first to identify the various volumes and the manner in which they are controlled, and then to describe the heat exchange system. Volumes 10 and 11 in combination make up the warm volume, while the intermediate volume is designated 12 and the cold volume 14. The warm volumes are defined within a drive housing 17 suitably sealed by an end plate 16, and having a mounting flange 18 which in turn can be fixed to a second flange 19 which is suitable for attachment to a support 20. Thus, the refrigerator is adapted to be mounted in apparatus which permits insulation (normally an evacuated chamber) to surround that portion above the warm volume 11. Warm volume 11 is defined by the drive housing 17 and by the lower portion of the warm end cylinder housing 23 which terminates in a rounded end 25. The cylinder end 25 in turn is connected to the cold displacer cylinder wall 26 through an adapter 27 which fits into bottom extension 28 of the cylinder wall 26. Cylinder wall 26 at its top end terminates in a thickened wall portion 29 which, as will be described below, is attached to a suitable heat station.

Within the warm end cylinder housing 23 is a warm end displacer 30 which is, of course, capable of vertical movement within the cylinder housing 23. This warm end displacer 30 terminates in a rounded section 31 designed to conform to the rounded end 25 of the cylinder wall. This upper section is permanently affixed to the main warm end displacer 30 through a bolt 32. At the bottom end of displacer 30 is a suitable O-ring seal 33 and a pair of wiper felts 34; and the displacer 30 has a bearing land 35 which forms a fluid-tight seal with the internal wall of the cylinder housing 23. There is also a section of displacer 30 which makes a fluid-tight fit with a drive shaft, to be described below, so that volumes 10 and 11 are isolated from volume 12.

The lower end of the displacer 30 is of a smaller diameter than the main section and is formed of a section 38, which is integral with displacer 30 and of three additional sections 39, 40 and 41 which contain recesses to hold the driving mechanism and to provide cams bearing surfaces for driving the displacers. These lower sections are held in fixed relationship with each other by means of dowel pin 42. The cold end displacer is indicated at numeral 44 and, as will become apparent below, is distinct in its operation from the warm end displacer 30.

Figure 4:
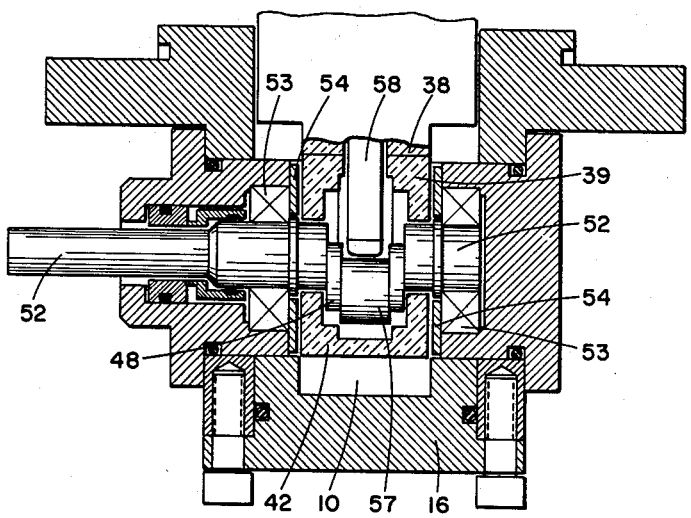
FIG. 4 is a cross-section of the driving mechanism of the refrigerator.

The mechanism by which the displacers are driven is illustrated in FIGS. 3a and 3b and 4, and reference should be had to these drawings in considering the following description. In order to maintain the driving mechanism of the two displacers within a minimum space, a type of Scotch yoke is preferred. The warm end displacer 30 is positively driven in both directions by means of a warm displacer drive cam 48 through upper cam bearing pad 49 and lower cam bearing pad 50. Driving is accomplished through the use of a drive shaft 52 (FIG. 4) which is held in proper alignment by bearings 53 and 54. Suitable means, not shown, are of course coupled to drive shaft 52 to rotate it at the desired speed.

The cold end displacer is driven by means of drive cam 56 through cam bearing pad 57 which in turn is affixed to a bearing sleeve 58 attached to the end of a drive rod 59. The other end of drive rod 59 is affixed to cold end displacer 44 through pin 60. Thus, as will be seen in FIG. 3b, the cold end displacer actually moves partly within the intermediate temperature volume 12, but defines the cold volume 14. Because of the relationship of the elements, it is necessary to provide in section 31 of the warm end displacer a recess 61 which permits clearance of the flanged end 28 of the cold end cylinder housing 26. Over that section of warm end displacer 30 which is designated by the numeral 36, the opening in displacer 30 through which drive shaft 59 passes is made to fit drive shaft 59 to form a fluid-tight seal.

In the embodiment illustrated in FIG. 3a, the cold end displacer is driven positively in the upward direction and returned by means of the action of spring 63 which operates within the recess defined by wall 64 and within the recess 65 in warm end displacer 30. It is of course within the scope of this invention to provide positive drive means for movement of the cold end displacer in both directions.

It is now possible to describe the heat exchange system of the refrigerator, and for convenience this will be done by tracing the path of the fluid flow within the apparatus. A conduit 68 is provided for introducing a fluid into the apparatus and for subsequent sealing of the fluid within the closed cycle system. The warm volumes 10 and 11 are connected by a series of conduits and passages including the conduit 70 and passageway 71 which is defined by the annular space between bearing sleeve 58 and recess wall 64. The fluid then flows into the recess 72 defined by the three lower sections of the displacer end, thence through port 73 into the warm volume 10. Fluid is then transferred from the warm volume 10 to the warm end heat exchanger 77 by way of fluid passageway 78. This warm end heat exchanger comprises a wall 80 formed of a metal which is a good room-temperature heat conductor, fluid-tightly sealed by means of a top plate 81 which serves to affix the room temperature heat exchanger 77 into the end plate 16, and by a bottom end plate 82. Heat transfer fins 83 are affixed and thermally bonded to the outside wall 80, and heat transfer surfaces or fins 84 are in turn thermally bonded to the inside of wall 80 so that there is provided a heat path from the atmosphere to the fluid within heat exchanger 77 by way of fins 83 and surfaces 84. Thus, fluid entering room temperature heat exchanger 77 is warmed by the ambient conditions prevailing around this heat exchanger.

Conduit 75 which extends through a portion of heat exchanger 77 conveys the warm fluid to a first regenerator 88 which, in accordance with usual practice, is filled with packing material such as foraminous disks 89 which are held in place by means of perforated end plates 90 and 91. Conduit 93 leads from the upper end of regenerator 88 into a heat station 94. The heat station is formed of relatively thick walls of a metal which is a good thermal conductor at the temperature prevailing in the heat station, e.g., liquid nitrogen temperature. Heat station 94 is affixed to section 25 of the warm end cylinder by means of an adapter 97. It is fluid-tightly sealed at its top end by means of plug 98 and defines within a volume 99 which is primarily occupied by heat transfer surfaces 100. Inasmuch as it is necessary for fluid entering volume 12 to first enter the heat station, conduit 93 discharges fluid into volume 99 and passageway 102 is provided for the return of the fluid into volume 12. Conduits 75 and 93 which are affixed to the warm end displacer 30 move up and down within heat exchanger 77 and heat station 94 and define in them the required gas passageways 78 and 102, respectively.

Liquid nitrogen coils 106 surround that portion of cylinder housing 30 which corresponds to intermediate temperature volume 12. Liquid nitrogen is introduced into coils 106 through inlet conduit 107. This conduit is in turn protected by means of a sheath 108 over that portion which is exposed to ambient conditions. Sheath 108 along with end plugs 109 and 110 define around at least that portion of the conduit 107 exposed to ambient conditions an evacuated space provided for insulation.

Liquid nitrogen in coils 106 is then transferred by means of conduit 114 to cooling coils 115 which surround and are in thermal contact with wall 96 of heat station 94. Conduit 121 serves to communicate between heat station 94 and regenerator 122. This conduit 121 enters regenerator 122 through the bottom seal plug 120. The regenerator contains packing such as steel wool 123 which in turn is retained within the regenerator by means of perforated end plates 124 and 125. Through top end plug 126 passes conduit 127 which communicates between regenerator 122 and heat station 130, this being the place at which refrigeration is delivered to a load. This heat station is formed of thick walls 131 constructed out of metals of high heat conductivity at the low temperatures involved. In wall 131 is a passageway 132 which leads to a series of foraminous heat transfer surfaces 133 which in turn form the top portion of cold volume 14.

As has been stated, in order to obtain maximum efficiency from the cycle employed the volumes in the apparatus of this invention must bear certain relationships to each other. It is preferable that the warm volume (a combination of volumes 10 and 11) be approximately equivalent to the intermediate temperature volume 12. Moreover, it is necessary that the warm volume (10 and 11) be at least ten times greater than the cold volume 14.

Figure 5:
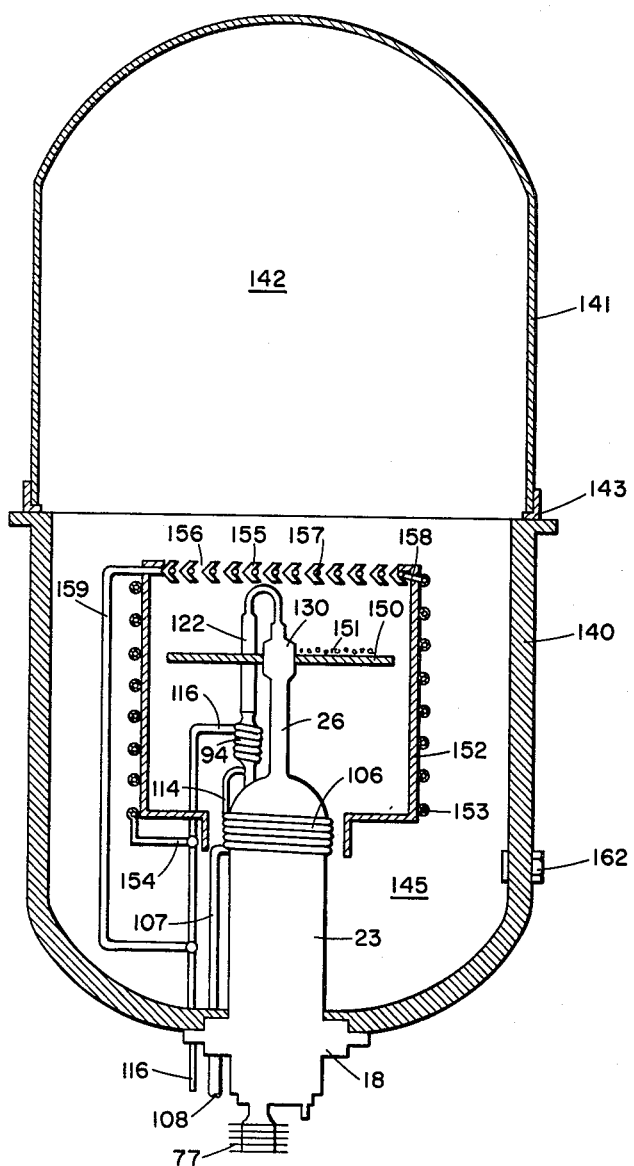
FIG. 5 illustrates partly in cross-section a cryopump incorporating the refrigerator of this invention.

FIG. 5 illustrates a cryopump apparatus incorporating the refrigeration apparatus of this invention. It will be seen to be formed of two main housings, 140 and 141, the latter defining an evacuated working chamber 142. These housings are maintained in gas-tight seal relationship with each other through suitable sealing means such as 143. Within the lower volume 145, defined by housing 140, is positioned the refrigeration apparatus and its attendant radiation shielding along with the condensing surface required in the cryopump. In the refrigeration apparatus of FIG. 5 like numbers refer to like elements illustrated in FIGS. 3a and 3b.

In the cryopump illustrated in FIG. 5, the load is the condensing surface 150 which is thermally bonded to heat station 130. The entire apparatus is protected by radiation shield 152 which has wrapped around it liquid nitrogen cooling coils 153. A valve-controlled branch conduit 154 serves to introduce liquid nitrogen into coils 153 from the return conduit 116 thus using the liquid nitrogen to cool the radiation shield 152 prior to its discharge. At the top of the radiation shield are a series of chevron cooling fins 155 which are so positioned to define between them a series of passageways 156. Cooling coils 157 are thermally bonded to each of the chevron cooling fins and they receive liquid nitrogen for cooling by means of a branch conduit 158 which communicates with the end of the cooling coils 153. In like manner, branch conduit 159 removes liquid nitrogen from cooling coils 157 to return it to the main liquid nitrogen return conduit 116. Finally, housing 140 is equipped with an adapter 162 by which the entire volume may be evacuated in a rough manner through the use of a vacuum pump, not shown. By means of the cryopump apparatus illustrated in FIG. 5, it is possible to attain vacuums around $10^{-9}$ to $10^{-10}$ mm. Hg.

In a modification of the cryopump of this invention, as shown in FIG. 5, the condensing surface 150 is covered with an adsorbing material 151 such as an activated carbon. Those residual gases remaining in volumes 142 and 145 after evacuation with a vacuum pump are then effectively removed through a combination of adsorption and condensation, thus making a more efficient cryopump.

Under some circumstances, it may be desirable to provide refrigeration at two or more temperature levels below that of the intermediate temperature. For example, it may be desirable to provide refrigeration at 25° K. and at 10° K. for operation with a separate Joule-Thomson stream and heat exchanger in providing helium liquefaction or liquid helium temperature refrigeration.

FIG. 6 illustrates apparatus in diagrammatic form which would be capable of providing refrigeration at two or more temperature levels. In the apparatus of FIG. 6, there is provided a large cylinder 170 in which a displacer 171 is driven by a suitable shaft, such as 172. The movement of the displacer 171 in cylinder 170 defines a warm volume 173 and an intermediate temperature volume 174. Two smaller cylinders 176 and 177 are integral with cylinder 170 and displacers 178 and 179 operate within these two smaller cylinders. In their movement, these displacers define two cold volumes 180 and 181. The displacers 178 and 179, which are in effect one displacer, are in phase and hence the variations in the cold volumes 180 and 181 are also in phase. The displacers 178 and 179 are in turn driven by a shaft 183 which passes down through displacer 171. In this modification the shaft driving means is completely external of the apparatus.

An examination of FIG. 6 will show that the same heat transfer system is used as in the case of the apparatus shown in FIGS. 3a and 3b. In the apparatus of FIG. 6, heat exchanger 186 is the warm end heat exchanger, regenerator 187 is the first heat storage means comparable to regenerator 88 of FIGS. 3a and 3b, while heat station 188 is equivalent to the first heat station means 94 of FIG. 3b. Regenerators 190 and 191 in combination are equivalent to the second heat storage means, namely, regenerator 122 of FIG. 3b; while heat stations 193 and 194 in combination are equivalent to the second heat station means, i.e., heat station 130 of FIG. 3b.

Refrigeration loads may be thermally connected to heat stations 193 and 194, and cooling coils 196 and 198 are furnished as in FIGS. 3a and 3b.

It will be understood that in the case of an apparatus which provides refrigeration at two or more temperature levels, heat is pumped from each of the cold volumes (180 and 181 of FIG. 6) up to the intermediate temperature and the analysis given above apply to the consideration of the warm, intermediate temperature and any one of the cold volumes considered separately. However, it is possible to define the ratio of the warm volume to the cold volumes more generally in this case and to show that the warm volume $V_W$ can be determined by the relationship $$V_W = \left(\frac{T_W}{T_W - T_I}\right)\left[\left(\frac{T_I - T_{C_1}}{T_{C_1}}\right)V_{C_1} + \left(\frac{T_I - T_{C_2}}{T_{C_2}}\right)V_{C_2}\right]$$

wherein V represents volume and T is the fluid temperatures in ° K., and the subscripts W, I, $C_1$ and $C_2$ refer to the warm, intermediate and first and second cold volumes, respectively. It is to be understood that the number of cold volumes is not limited to two, but may be a plurality of volumes communicating through heat stations and heat storage means in the same manner as cold volumes 180 and 182 do in FIG. 6.

From the above description of the refrigeration apparatus of this invention, it will be seen that there is provided a small, efficient cryogenic refrigerator which is suitable for incorporation into many different types of apparatus which depend upon cryogenic temperatures for their operation. The refrigerator also makes it possible to eliminate the use of liquid hydrogen as a cryogenic cooling fluid and to use only liquid nitrogen.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

I claim:
1. A closed cycle cryogenic refrigerator comprising in combination
   (a) fluid tight housing means;
   (b) first and second displacers independently operable within said housing means and defining therein a warm volume, an intermediate temperature volume and at least one cold volume, the relation of said warm volume to said cold volume being represented by a value which is no less than that given by the expression

$$V_W = \left(\frac{T_W}{T_W - T_I}\right)\left[\left(\frac{T_I - T_{C_1}}{T_{C_1}}\right)V_{C_1} + \left(\frac{T_I - T_{C_2}}{T_{C_2}}\right)V_{C_2}\right]$$

wherein V is volume, T is fluid temperature in ° K., and the subscripts W, I, $C_1$ and $C_2$ refer to the warm, intermediate temperature, and first and second cold volumes, respectively;
   (c) means for controlling the motion of said displacers;
   (d) a warm end heat exchanger adapted to transfer heat from its surroundings to fluid circulating therein and communicating with said warm volume;
   (e) first heat storage means communicating with said warm end heat exchanger;
   (f) a first heat station means adapted to cool fluid prior to its introduction into said intermediate temperature volume and communicating with said first heat storage means;
   (g) second heat storage means;
   (h) second heat station means in thermal contact with each of said cold volumes and communicating with said first heat station means through said second heat storage means;
   (i) first coils external of said housing and corresponding in location to said intermediate volume, said coils being adapted to conduct a refrigerant and to effect heat transfer between said refrigerant and fluid in said intermediate volume;
   (j) second coils external of said first heat station means and in thermal contact therewith communicating with said first coils; and
   (k) conduit means adapted to cycle refrigerant through said first coils and said second coils.

2. Refrigerator in accordance with claim 1 further characterized in that said fluid-tight housing means includes mounting means adapted to incorporate said refrigerator into apparatus in a manner to expose the warm end of said refrigerator to ambient conditions while thermally insulating the remaining portion of said refrigerator.

3. A closed cycle cryogenic refrigerator comprising in combination
   (a) a fluid-tight housing;
   (b) first and second displacers independently operable within said housing and defining therein a warm volume, an intermediate temperature volume and a cold volume, the ratio of said cold volume to said warm volume being no greater than the numerical value of the expression $$\left[\frac{T_W - T_I}{T_W}\right] \cdot \left[\frac{T_C}{T_I + T_C}\right]$$

wherein $T_W$, $T_I$, and $T_C$ are the temperatures, expressed as ° K., of the fluids in said warm volume, said intermediate temperature volume, and said cold volume, respectively;
   (c) means for controlling the motion of said displacers;
   (d) a warm end heat exchanger adapted to transfer heat from its surroundings to fluid circulating therein and communicating with said warm volume;
   (e) first heat storage means communicating with said warm end heat exchanger;
   (f) a first heat station means adapted to cool fluid prior to its introduction into said intermediate temperature volume and communicating with said first heat storage means;
   (g) a second heat storage means;
   (h) a second heat station means in thermal contact with said cold volume and communicating with said first heat station means through said second heat storage means;
   (i) first coils external of said housing and corresponding in location to said intermediate volume, said coils being adapted to conduct a refrigerant and to effect heat transfer between said refrigerant and fluid in said intermediate volume;

(j) second coils external of said first heat station means and in thermal contact therewith communicating with said first coils; and (k) conduit means adapted to cycle refrigerant through said first coils and said second coils.

4. Refrigerator in accordance with claim 3 wherein said first heat storage means is located within said first displacer.

5. Refrigerator in accordance with claim 3 wherein said warm volume comprises a plurality of separate volumes in fluid communication and contains said means for controlling the motion of said displacers.

6. Refrigerator in accordance with claim 3 further characterized in that said fluid-tight housing includes mounting means adapted to incorporate said refrigerator into apparatus in a manner to expose the warm end of said refrigerator to ambient conditions while thermally insulating the remaining portion of said refrigerator.

7. Refrigerator in accordance with claim 3 wherein said ratio of said cold volume to said warm volume is no greater than 1:10.

8. Refrigerator in accordance with claim 3 wherein said first heat storage means is located within said first displacer and communicates with said warm end heat exchanger and with said first heat station means by way of conduits movable within said warm end heat exchanger and said first heat station means.

9. A cryopump, comprising in combination (a) a working chamber; and (b) a refrigeration chamber in communication therewith, said working chamber and said refrigeration chamber forming a fluid-tight, evacuatable volume; said refrigeration chamber having mounted therein a refrigerator comprising, in combination (1) a fluid-tight housing, (2) first and second displacers independently operable within said housing and defining therein a warm volume, an intermediate temperature volume and a cold volume, the ratio of said cold volume to said warm volume being no greater than the numerical value of the expression $$\left[\frac{T_W - T_I}{T_W}\right] \cdot \left[\frac{T_C}{T_I - T_C}\right]$$

wherein $T_W$, $T_I$ and $T_C$ are the temperatures, expressed, as °K., of the fluids in said warm volume, said intermediate temperature volume, and said cold volume, respectively, (3) means for controlling the motion of said displacers, (4) a warm end heat exchanger adapted to transfer heat from its surroundings to fluid circulating therein and communicating with said warm volume, said warm volume and said warm end heat exchanger being positioned outside said evacuatable volume, (5) first heat storage means communicating with said warm end heat exchanger, (6) a first heat station means adapted to cool fluid prior to its introduction into said intermediate temperature volume and communicating with said first heat storage means, (7) a second heat storage means, (8) a second heat station means in thermal contact with said cold volume and communicating with said first heat station means through said second heat storage means, (9) first coils external of said housing and corresponding in location to said intermediate volume, and

(10) second coils external of said first heat station means and in thermal contact therewith communicating with said first coils;

(c) radiation shielding defining an annular enclosure around said refrigerator extending from said intermediate temperature volume to said cold volume;

(d) heat transfer surfaces positioned within the ring defined by the cold end of said radiation shielding and adapted to provide fluid passages into said annular enclosure;

(e) third coils in thermal contact with the outer wall of said radiation shielding and said heat transfer surfaces;

(f) fluid conduit means adapted to circulate a fluid refrigerant through said first, second and third coils; and (g) a condensing surface in thermal contact with said second heat station means adapted to be maintained at cryogenic temperatures thereby to condense residual gases within said chambers.

10. Cryopump in accordance with claim 9 further characterized in that said condensing surface has affixed thereto a fluid adsorbing material.

References Cited in the file of this patent

UNITED STATES PATENTS

| | | |
|---|---|---|
| 2,567,454 | Taconis | Sept. 11, 1951 |
| 3,091,092 | Dros | May 28, 1963 |
| 3,115,014 | Hogan | Dec. 24, 1963 |

OTHER REFERENCES

Proceedings of the 1956 Cryogenic Engineering Conference, University of Colorado, Boulder, Colorado. February 1957, pp. 188–196.